United States Patent [19]

Linton et al.

[11] Patent Number: 5,087,221

[45] Date of Patent: Feb. 11, 1992

[54] PROCESSED SHRIMP PRODUCT HAVING EASILY REMOVABLE SHELL AND METHOD OF PRODUCING SAME

[75] Inventors: James B. Linton, Grandville; John M. Gordon, Jr., Grand Rapids, both of Mich.

[73] Assignee: Gordon Food Service, Inc., Grand Rapids, Mich.

[21] Appl. No.: 423,369

[22] Filed: Oct. 19, 1989

[51] Int. Cl.⁵ .................. A22C 25/00; A22C 29/02
[52] U.S. Cl. .......................................... 452/5; 452/2
[58] Field of Search .............................. 452/5, 2

[56] References Cited

U.S. PATENT DOCUMENTS

| | | | |
|---|---|---|---|
| 3,430,288 | 3/1969 | Lapeyre | 452/5 |
| 4,987,644 | 1/1991 | Marion | 452/5 |

FOREIGN PATENT DOCUMENTS 969944  10/1984  Japan .................................. 452/5

*Primary Examiner*—Willis Little
*Attorney, Agent, or Firm*—Waters & Morse

[57] ABSTRACT

Shrimp in the raw or blanched condition is prepared for market after removal of the head by slitting the tail segments along the belly portion, preferably leaving the end segments intact. The shrimp is then frozen and packed. The slit extends through the connective tissue of the shell sections, which can easily be unwrapped from the meat after cooking.

20 Claims, 1 Drawing Sheet

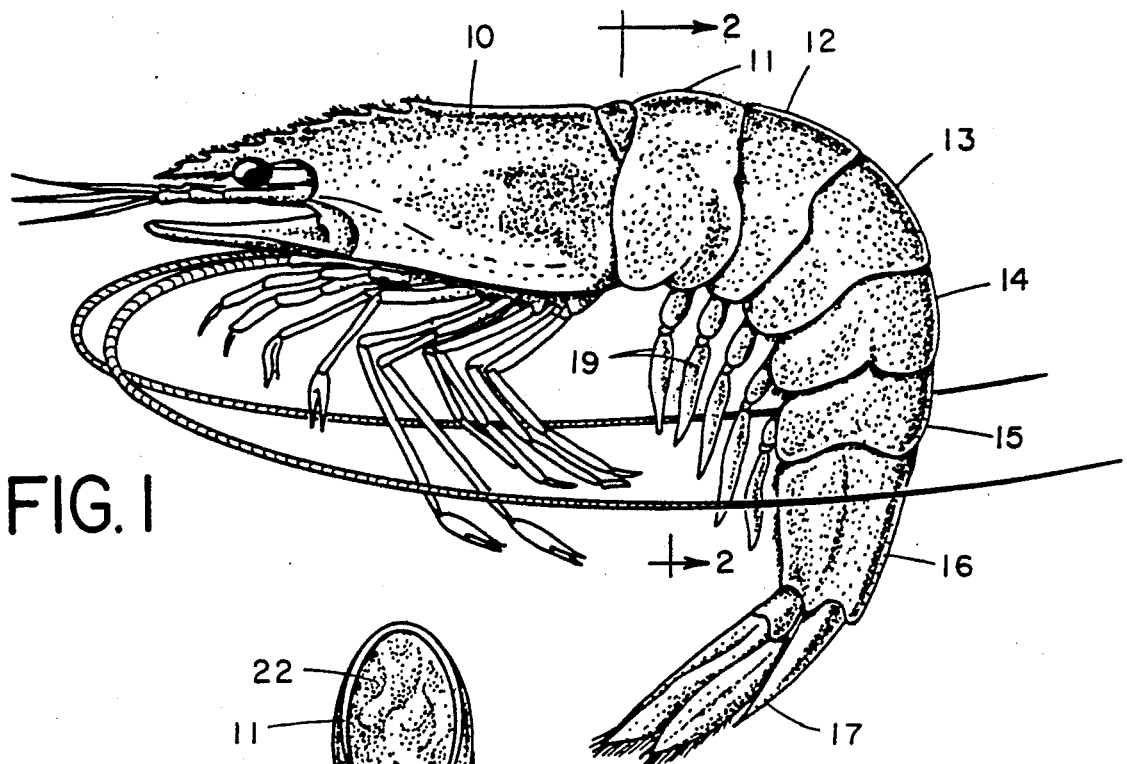
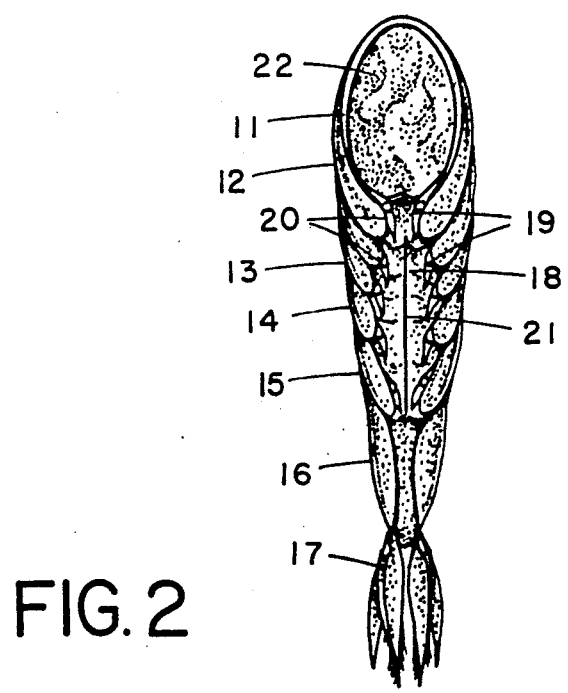

PROCESSED SHRIMP PRODUCT HAVING EASILY REMOVABLE SHELL AND METHOD OF PRODUCING SAME

BACKGROUND OF THE INVENTION

Shrimp has always been considered a delicacy, and preparation of this nutritious seafood for market must be directed at preserving its freshness and appearance. Experience has established that the texture and the prevention of dehydration from freezing require that the shrimp be marketed raw (or blanched), and with the shell still in place. Normally, the head section is removed by the processor and the shrimp is frozen, covered with a protective glaze of ice, and packaged.

Seemingly small features that add to the convenience of serving shrimp can make a significant difference in the competitive marketing of an item that is otherwise similar from all suppliers. Such features invite the use of specific advertising, and a trademark that directs the consumer's attention to the product of a particular supplier. The focus of the present invention is in making it easier for the consumer to remove the shell of the shrimp after cooking.

Shrimp have a head section and six articulating shell sections covering the flesh or meat-containing tail. With the head section previously removed, the tail is customarily cooked in its original condition, with the shell intact. The shell enhances cooking of the shrimp as well as protecting the shrimp during frozen storage. Removal of the shell sections covering the tail requires some degree of dexterity, as the tissue joining the edges of the shell sections along the "belly" of the shrimp must be broken before the shell segments can be pulled off. The portion of the shrimp referred to as the "belly" extends along the inside of the typical curvature of the shrimp tail. Attempts have been made to facilitate the removal of the shell segments by slitting them around the girth of the tail, but this has not been satisfactory. Cutting in this manner tends to expose the meat, and does little to facilitate removal of the shell. The shell segments, with the exception of the last one, are somewhat C-shaped in cross section, and have a degree of stiffness similar to that of a leaf spring having such a configuration. The shell sections should be left as intact as possible to clasp the meat and maintain a protective position.

SUMMARY OF THE INVENTION

In addition to the usual preparation of shrimp for the market, the tail of the shrimp is slit along the belly portion, preferably leaving the opposite end sections intact. The slit should sever the connective tissue holding the edges of the C-shaped shell sections together but preferably does not penetrate deeply into the underlying flesh. The natural spring resilience of these sections is thus preserved, and permits them to clasp the meat sufficiently to maintain the protective shielding function of the shell during storage and cooking. The shell sections are then easily unwrapped from the meat, and the end portions of the meat are pulled axially out of engagement with the end shell segments. Leaving the end segments unslit further helps to retain the protective position of the shell.

DESCRIPTION OF THE DRAWINGS

FIG. 1 is a plan view of a shrimp in its original state.

FIG. 2 is a section on the Plane 2—2 of FIG. 1.

DESCRIPTION OF THE PREFERRED EMBODIMENT

FIG. 1 illustrates the condition of a shrimp as it is taken from the ocean or farm pond. The head section 10 may be considered as everything to the left of the section plane 2—2. This section is first removed by a standard technique. The remaining tail section is the valuable portion of the shrimp that is marketed. This includes the segments 11-16, with or without the fan or tail 17. Each of the shell sections 11-15 is C-shaped in cross section, with considerable spring-like resilience. The ends of these segments along the belly are spaced, forming a gap interconnected by a connective tissue indicated at 18, which tends to hold the edges of the shell sections together in the natural condition of the shrimp. The end segment 16 is normally more circular in cross section. Two groups of five legs each 19 and 20 (pleopods) are arranged one on each side of the belly portion, as shown in FIG. 2. The present invention centers in slitting the connective tissue 18 between these groups of legs along the belly portion, preferably excluding the end segments 11 and 16 from the slitting process. The position of the slit is shown at 21 in FIG. 2, and should extend along the gap through the connective tissue 18, thus freeing the intermediate shell sections so that they can be unwrapped easily from the meat after the shrimp has been cooked. The slit is narrow and desirably does not extend deeply into the underlying flesh, thus minimizing the amount of flesh that becomes exposed prior to cooking and maximizing the protection of the surrounding shell for freezing and cooking. The slit is made with a sharp knife or the like so that the opposite edges of the connective tissue along the slit remain in close proximity to each other after slitting, until the shrimp is cooked and peeled for eating.

After cooking the center sections of the meat are easily removed by peeling the shell away from the slit portion. The meat is then pulled axially free from the end sections 11 and 16. As an alternative, the end section 11 can also be unwrapped, as the remaining connective tissue is easily broken. This arrangement leaves enough of the capability of the shell sections to maintain their position around the meat 22, and thus provide full protection to preserve the texture and appearance desired by the consumer.

The usual procedures in processing shrimp, including washing, freezing, glazing with a thin sheet of ice to prevent dehydration, and packaging will normally be carried out in addition to and after the slitting operation described above, prior to sale to the consumer. These procedures need not be modified to accommodate the present invention.

I claim:

1. A method for processing shrimp prior to marketing so as to facilitate the removal of the shell from the shrimp after cooking, said shrimp having a curved segmented tail, the method comprising:
    slitting at least one of the segments of said tail along the edge thereof at the inside of the curvature of said tail, the slit being formed such that the shell continues to substantially surround and protect the flesh of the shrimp during storage and cooking but is more easily removed for eating.

2. A method as defined in claim 1, wherein the shell of certain of said segments has a C-shaped cross-section providing a gap, and said slitting extends along said gap, and the segments at the opposite ends of said tail are left unslit.

3. A method as defined in claim 1, wherein the slitting of said segment is done with said shrimp in the raw condition.

4. In a process for preparing shrimp for market, wherein the shrimp has a head and a tail covered by a shell consisting of a flesh interior surrounded by a plurality of interconnected segments terminating in a tail segment, the segment comprising C-shaped members extending over the sides and back of the shrimp and connective tissue extending over the belly of the shrimp, the process comprising de-heading, freezing and packaging the shrimp without removal of the shell, the improvement comprising slitting one or more of the segments of the shell through the connective tissue along the belly of the shrimp, the slit being formed such that the shell continues to substantially surround and protect the flesh during frozen storage and cooking but is more easily removed after cooking by spreading the shell at the slit.

5. A process according to claim 4 wherein the shell segment at the end of the tail adjacent the removed head is not slit.

6. A process according to claim 4 wherein the tail segment of the shell is not slit.

7. A process according to claim 4 wherein the slit extends through a plurality of the shell segments but not through the shell segments at opposite ends of the tail.

8. A process according to claim 4 wherein the slit is sufficiently narrow that the edges of the connective tissue on opposite sides of the slit remain in close proximity after slitting, substantially maintaining the protection of the shell over the flesh under the slit.

9. A process according to claim 8 wherein the slit extends through the connective tissue but does not penetrate deeply into the flesh on the inside of the slit, thus assisting in maintaining the narrowness of the slit.

10. A processed shrimp tail having a shell that may be removed after cooking with enhanced ease, the shell consisting of a plurality of interconnected C-shaped shell segments extending over the sides and back of a flesh portion of the shrimp and terminating in a tail segment, with outer ends of the C-shaped segments being interconnected by connective tissue extending across the belly of the shrimp, the shrimp having a slit along its belly extending through the connective tissue of one or more shell segments, the slit being formed such that the shell continues to substantially surround and protect the flesh during frozen storage and cooking.

11. A processed shrimp tail according to claim 10 wherein the slit does not extend through the segments at opposite ends of the tail.

12. A processed shrimp tail having a shell that may be removed after cooking with enhanced ease, the shell consisting of a plurality of interconnected C-shaped shell segments extending over the sides and back of a flesh portion of the shrimp and terminating in a tail segment, with outer ends of the C-shaped segments being interconnected by connective tissue extending across the belly of the shrimp, the shrimp having a slit along its belly extending through the connective tissue of one or more shell segments, the slit not extending completely through the shell segment at the end opposite the tail segment.

13. A process shrimp tail according to claim 12 wherein the slit does not extend completely through the tail segment.

14. A processed shrimp according to claim 13 wherein the slit is sufficiently narrow that the opposed edges of the slit are in close proximately to each other, the shrimp being frozen in that condition, the shell substantially surrounding the flesh portion and serving to protect the flesh portion during frozen storage and cooking.

15. A processed shrimp according to claim 14 wherein the slit does not penetrate deeply into the flesh portion.

16. A processed shrimp tail according to claim 10, wherein the slit does not extend through at least a portion of one or more tail segments, such that the tail is urged to remain in place on the flesh during storage and cooking.

17. A method according to claim 4, wherein the slit extends through all the segments between the segments at opposite ends of the tail.

18. A method according to claim 4, wherein the slit does not extend all the way through the end segment adjacent the removed head.

19. A method according to claim 4, wherein the slit does not extend all the way through the end segment adjacent the tail.

20. A method according to claim 4, wherein the slit extends for a substantial portion of the length of the shrimp, but at least a portion of one or more segments is not slit through, such that the shell is held in place on the flesh of the shrimp for storage and cooking, but the shell is still easy to remove for eating.

* * * * *